US012808305B2

(12) United States Patent
Álvarez García et al.

(10) Patent No.: US 12,808,305 B2
(45) Date of Patent: Nov. 24, 2026

(54) SHROUDED TURBINE STRUCTURE OVERTIP LEAKAGE SEALING

(71) Applicant: INDUSTRIA DE TURBO PROPULSORES, S.A.U., Zamudio (ES)

(72) Inventors: José Javier Álvarez García, Zamudio (ES); Antonio Revuelta Bayod, Zamudio (ES); Manuel Castilla Buongiovanni, Zamudio (ES)

(73) Assignee: INDUSTRIA DE TURBO PROPULSORES, S.A.U., Zamudio (ES)

( * ) Notice: Subject to any disclaimer, the term of this patent is extended or adjusted under 35 U.S.C. 154(b) by 0 days.

(21) Appl. No.: 19/178,656

(22) Filed: Apr. 14, 2025

(65) Prior Publication Data

US 2026/0160175 A1 Jun. 11, 2026

(30) Foreign Application Priority Data

May 30, 2024 (EP) .................................... 24382578

(51) Int. Cl.

*F01D 11/08* (2006.01)
*F01D 25/12* (2006.01)
*F01D 25/24* (2006.01)

(52) U.S. Cl.

CPC .............. *F01D 11/08* (2013.01); *F01D 25/12* (2013.01); *F01D 25/24* (2013.01); *F05D 2220/32* (2013.01)

(58) Field of Classification Search

CPC .......... F01D 11/08; F01D 11/10; F01D 11/12; F01D 11/122; F01D 11/127; F01D 25/12; F01D 25/24; F01D 5/186; F05D 2220/32; F05D 2240/307

See application file for complete search history.

(56) References Cited

U.S. PATENT DOCUMENTS 7,494,319 B1 * 2/2009 Liang ...................... F01D 11/10 416/97 R
8,096,767 B1 1/2012 Liang
8,632,309 B2 1/2014 Tsypkaykin et al.
2005/0175453 A1 8/2005 Dube et al.
2016/0169052 A1 6/2016 Balliel et al.
2017/0130588 A1 * 5/2017 Townes ................... F01D 11/08
2017/0298744 A1 * 10/2017 Zhang ....................... F01D 5/18
2018/0355727 A1 * 12/2018 Walunj .................... F01D 11/08
2018/0355742 A1 * 12/2018 Telman ................... F01D 5/187
2022/0316346 A1 * 10/2022 Pellaton .................. F01D 5/225

OTHER PUBLICATIONS

European Seach Report for App. No. 24382578.3 mailed Oct. 16, 2024 in 7 pages.

* cited by examiner

*Primary Examiner* — Elton K Wong

(74) *Attorney, Agent, or Firm* — Knobbe, Martens, Olson & Bear, LLP

(57) ABSTRACT

The present disclosure relates to a seal arrangement and particularly to a seal arrangement for a structure used in a gas turbine engine such as a blade, disc or a bearing. Specifically, the present disclosure provides a structure with a seal fin, a structure arrangement for a gas turbine engine and a gas turbine engine.

13 Claims, 3 Drawing Sheets

SHROUDED TURBINE STRUCTURE OVERTIP LEAKAGE SEALING

TECHNICAL FIELD

The present disclosure relates to a seal arrangement and particularly to a seal arrangement for a structure used in a gas turbine engine such as a blade, a disc or a bearing. Specifically, the present disclosure provides a structure with a seal fin, a structure arrangement for a gas turbine engine and a gas turbine engine.

BACKGROUND

In the industry of turbomachinery used for example in aero engines, in order to optimize the efficiency of a gas turbine engine, it is necessary to maximize the quantity of gas acting on the blades, and in other words to minimize the leaks present essentially between the tip end of the blade and the outer casing or housing.

In order to limit the leakage between a tip end and the outer casing or housing, it is known to implant on a shroud arranged at the tip end of each blade at least one lip, protruding towards the outside from the shroud. The lips are intended to cooperate with a block of abradable material (e.g. a honeycomb structure) fixed to the outer casing or housing, to form a labyrinth-type dynamic seal joint. However, such a joint does not guarantee a complete sealing between the tip end and the block of abradable material.

Various configurations of blades provided with shrouds having seal fins are known. Most of them are passive, that is, nothing is injected. However, there are some other known solutions configured to inject a sealing gas over the aft face of the seal fin or at an angle with respect to the seal fin face, which are much less effective in terms of sealing capability.

The objective of the present disclosure is therefore to provide a new configuration of seal fins that improves the sealing capability in a gas turbine engine.

SUMMARY

The present disclosure provides a structure for a gas turbine engine, a structure arrangement for a gas turbine engine, and a gas turbine engine.

In a first inventive aspect, the present disclosure provides a structure for a gas turbine engine, the structure comprising:

a body extending from a root end to a tip end, a leading edge and a trailing edge, wherein the leading edge is adapted to be faced towards a leaking flow; and a shroud arranged at the tip end of the body and comprising at least one seal fin and a cooling conduct, the cooling conduct extending across the shroud;

wherein:

between the seal fin and a portion of the shroud proximal to the leading edge there is a first region, and between the seal fin and a portion of the shroud proximal to the trailing edge there is a second region; the first region being adapted to be faced towards the leaking flow and the second region being opposite to the first region relative to the seal fin;

the seal fin comprises a fore wall and an aft wall, the fore wall comprising a first height $H_1$ and the aft wall comprising a second height $H_2$ different to the first height $H_1$; wherein $$0 \leq \frac{H_1}{H_2} < 1;$$

the shroud further comprises a cooling passage extending from the cooling conduct through the seal fin to communicate the cooling conduct with the first region; and the cooling passage extends parallel to a surface of the aft wall closest to the cooling passage, so that a sealing fluid injected from the cooling conduct flows through the cooling passage and parallel to said surface of the aft wall.

The disclosure is intended to provide an improved sealing between a higher pressure forward cavity and a lower pressure rear cavity in a gas turbine engine. For this purpose, the disclosure provides the structure of the first inventive aspect.

The present structure is understood as any component of a gas turbine engine separating areas intended to be at different pressures. In an embodiment, the structure is one of the following: blade, disc or bearing. In any of these examples of structure, the structure is configured for sealing a higher pressure forward cavity from a lower pressure rear cavity when the gas turbine engine is running. The sealing is provided between the present structure and a housing surrounding the structure.

The present structure comprises a body that extends from a root end to a tip end. The tip end is the end furthest from the longitudinal axis of the gas turbine engine when the structure is implemented in a gas turbine engine, while the root end is the end closest to this longitudinal axis. In other words, the tip end is the closest end to the region where the sealing originates when the structure is in a gas turbine engine. The root end is opposite to the tip end and therefore the furthest away from the sealing region. In addition, part of the tip end of the structure is adapted to be faced towards a leaking fluid flowing through the gas turbine engine running when the structure is within it. Specifically, this leaking fluid flows through the gas turbine between the structure and the housing surrounding the structure.

The structure comprises a leading edge and a trailing edge. The leading edge of the structure is adapted to be faced towards a higher pressure than the pressure to which the trailing edge is adapted to be faced towards. In addition, the leading edge is adapted to be faced towards the leaking fluid.

Furthermore, the structure comprises a shroud located at the tip end of the body. This shroud is a substantially curved structural component that is preferably axial-symmetric relative to the longitudinal axis of the gas turbine engine. The shroud covers the whole or part of the tip end or even its extension may go beyond the tip end, i.e. protruding overhanging from the structure on the tip end. The shroud comprises a first shroud surface faced towards the outside of the structure and a second shroud surface opposite to the first shroud surface and faced towards the root tip of the structure.

The shroud comprises at least one seal fin. This seal fin protrudes from the first shroud surface. According to the present structure, there is a first region between the seal fin and the part of the shroud proximal to the leading edge, proximal being understood as the portion of the shroud that is closer to the leading edge of the body than to the trailing edge. In addition, there is a second region between the seal fin and other part of the shroud that is proximal to the trailing edge, proximal being understood as the portion of the shroud that is closer to the trailing edge of the body than to the leading edge. That is, since the seal fin protrudes from the shroud (specifically from the first shroud surface), the region over the shroud is divided in two, namely a first region and a second region, these regions being separated from each other by the seal fin. For this reason, the second region is opposite to the first region relative to the seal fin. The term "region" shall be understood as the space or zone between components, in this case between the seal fin and a part of the shroud. In addition, the first region is adapted to be faced towards the leaking fluid when the structure is in the gas turbine engine running.

In an embodiment, the first region is a higher pressure forward cavity and the second region is a lower pressure rear cavity, relative to the seal fin.

The shroud further compromises a cooling conduct that extends across the shroud. In an embodiment, the cooling conduct is in fluid communication with a channel arranged through a portion of the structure from the root end to the tip end. This channel is adapted for channeling a sealing fluid through the structure towards the cooling conduct.

The seal fin comprises a fore wall and an aft wall, the fore wall being closer to the first region than the aft wall. The fore wall comprises a first height $H_1$ and the aft wall comprises a second height $H_2$. The first height is different to the second height and the seal fin fulfils the following heights ratio condition:

$$0 \leq \frac{H_1}{H_2} < 1.$$

This heights ratio condition means that the seal fin always has an aft wall while there might not be a fore wall. In addition, said height ratio condition means that the first height of the fore wall, if present, is always lower than the second height of the aft wall. The heights of the seal fin are measured from the first surface of the shroud.

Moreover, the shroud comprises a cooling passage extending from the cooling conduct through the seal fin. This cooling passage provides a fluidic communication between the cooling conduct and the first region where it is intended to supply the sealing fluid coming from the cooling conduct. The cooling passage will be understood as the passage or channel that forms through the shroud and continues between the fore wall (if any) and aft wall of the seal fin to the first region. Thus, if $H_1=0$, the cooling passage will be the channel that forms through the shroud from the cooling passage and continues along at least part of the surface of the aft wall faced towards the first region. In any of these cases, the sealing fluid that is injected through the cooling passage of the seal fin flows parallel to the surface of the aft wall so that this sealing fluid, once it comes into contact with the first region, continues to flow parallel to the surface of the aft wall and starts to interact with a fluid in the first region through a shear layer, decreasing its speed progressively.

The sealing fluid injected into the first region is used to seal a higher pressure cavity from a lower pressure cavity in the gas turbine engine. In other words, this injected sealing fluid is used to seal the leaking fluid flowing through the gas tubing engine, specifically between the structure and a housing surround the structure.

The cooling conduct feeding the cooling passage has sufficient passage area to behave like a plenum, i.e. the pressure feeding the cooling passage throughout its tangential depth is practically the same, and therefore there is uniformity of pressures.

The present disclosure allows injecting a certain amount of sealing gas flow (sealing fluid) into a throat of a fluid leaking through a seal fin so that the flow of leaking fluid decreases since the leaking fluid has to share the effective area available with the sealing fluid, as well the discharge coefficient of the leaking fluid is considerably reduced. This is achieved by guiding the sealing fluid through the mentioned cooling passage.

The present structure provides the following advantages:

- More tolerant to structure rubbing than the prior art solutions where both walls of the seal fin have the same height.
- The area controlling the sealing fluid injection is far from the blade tip, which is the area most susceptible to degradation, due to the high velocities and because, if there is friction with the static part (or housing), it will distort and could alter the flow control area of sealing fluid.
- Reduced heat generation due to $H_1<H_2$ that involves a reduction of the contact surface with the static part (or housing) in case of friction.
- The geometry of the structure is less complex compared with the prior art solutions wherein the walls of the seal fin have the same height and therefore the casting of the seal fin is simpler.
- Lesser flow non-uniformity effects due to sealing fluid flow diffusion before reaching the seal fin tip, thus achieving a more uniform circumferential flow.
- More stable injection sealing fluid flow since seal fin clearance does not affect the sealing fluid flow discharge coefficient.
- The maximum leaking flow discharge coefficient reduction effect is achieved since the sealing fluid flow is injected parallel to the aft wall and flows on the fore face of the aft wall comparing with the prior art solution wherein the sealing fluid is injected at an angle relative to the wall of the seal fin.

The sealing effectiveness is the main driver of the present structure whilst the cooling of the structure is a subsidiary benefit.

In an embodiment, the first height $H_1$ of the fore wall is 0. As already described above, in this embodiment the sealing fluid injected from the cooling conduct flows parallel to the aft wall and progressively starts to interact with a fluid in the first region through a shear layer, losing some of its speed.

In an embodiment, the first height $H_1$ of the fore wall is greater than 0 and lower than the second height $H_2$ of the aft wall. In this embodiment, when the sealing fluid ends its path between the fore wall and the aft wall the sealing fluid continues to flow parallel to the aft wall and starts to interact with a fluid within the first region losing some of its speed progressively.

In an embodiment, the seal fin is inclined towards the leading edge relative to the shroud. In other words, the seal fin is inclined towards the first region or the leaking fluid inlet. Advantageously, inclining the seal fin relative to the shroud favours the sealing.

In an embodiment, the cooling passage is a prism with a polygonal base.

In an embodiment, the cooling passage comprises a cylindrical configuration. In an embodiment, the cylindrical configuration in the cooling passage is manufactured by machining which provides greater precision in area control.

In an embodiment, the cooling passage is inclined at an angle of 90° relative to a longitudinal axis passing through the cooling conduct. In another embodiment, the cooling passage is inclined at an angle different from 90° relative to a longitudinal axis passing through the cooling conduct. In other words, the cooling passage is arranged according to a direction forming an angle relative to the longitudinal axis of the cooling conduct through the shroud, the angle being 90° or other than 90°. In a more particular embodiment, this angle is lower than 90°. Thus, the intersection between the direction of cooling passage and the longitudinal axis of the cooling conduct forms said angle.

In an embodiment, both the seal fin and the cooling passage are arranged according to a direction forming an angle relative to a longitudinal direction of the cooling conduct through the shroud, the angle being lower than 90°.

Advantageously, the inclination of the cooling passage relative to the longitudinal axis passing through cooling conduct, namely longitudinal angle of the seal fin, reduces the leaking fluid discharge coefficient. In addition, the tangential angle of the seal fin allows discharging sealing fluid with a tangential velocity component that contributes to reduce leaking flow aerodynamic spoiling losses.

In an embodiment, the shroud comprises a plurality of cooling passages distributed along the shroud and extended from the cooling conduct through the seal fin.

In an embodiment, at least one of the cooling passages is a slot. The slot is understood as a prism with a polygonal base.

In an embodiment, the cooling passage is a single continuous slot along the shroud.

In an embodiment of a single continuous slot, there is a plurality of guides located between the fore wall and the aft wall and configured for guiding the sealing fluid through the continuous slot.

In a second inventive aspect, the present disclosure provides a structure arrangement for a gas turbine engine, the structure arrangement comprising:

- at least one structure according to any one of the previous embodiments of the first inventive aspect,
- a housing at least partially surrounding the structure and
- a gap extended between the tip end of the body of the structure and the housing, wherein the seal fin of the structure protrudes from the shroud through the gap leaving a throat between an end tip of the seal fin and the housing.

The structure arrangement has the purpose to seal the clearance between the structure and the housing. According to a gas turbine engine, one of the housing or structure, which configure where the leak goes, is rotating and the other is static. Most commonly, it is the structure which rotates but it could be the other way around. This is often the case because the seal fin may rub against an abradable material (i.e., with the capability to abrade), which is a part that is welded to the base material of the housing. If the abradable part were to rotate at high speed, there would be a risk of it coming loose.

Given that the first height of the fore wall is always lower than the second height of the aft wall, this means that the fore wall never reaches or contacts with the housing.

The seal fin is used when one of the structure or the housing, which make up the clearance to be sealed, is rotating, which implies that both structure and housing are axil-symmetrical.

In a third inventive aspect, the present disclosure provides a gas turbine engine comprising a structure arrangement according to the second inventive aspect.

DESCRIPTION OF THE DRAWINGS

These and other characteristics and advantages of the disclosure will become clearly understood in view of the detailed description of the disclosure which becomes apparent from a preferred embodiment of the disclosure, given just as an example and not being limited thereto, with reference to the drawings.

DETAILED DESCRIPTION

Figure 1:
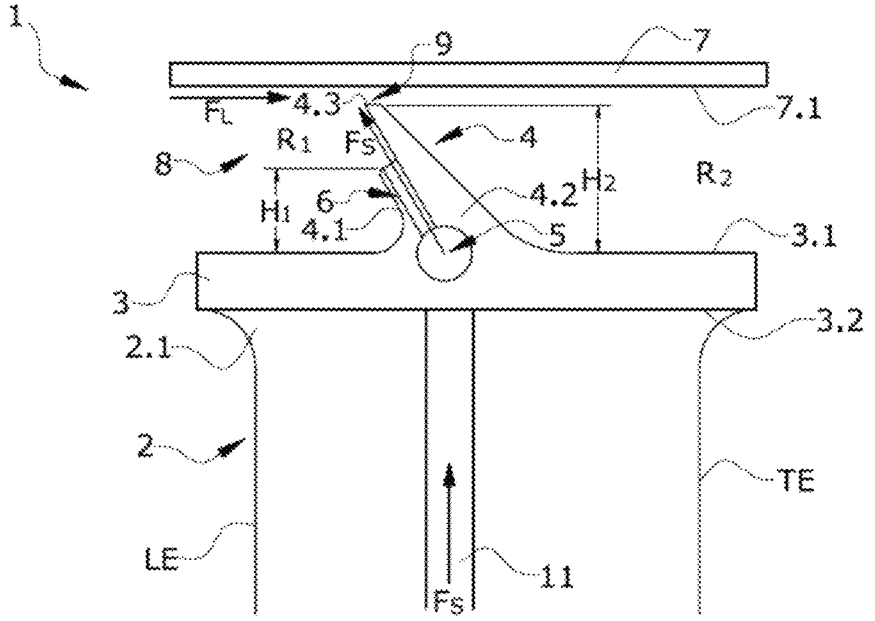
FIG. 1 This figure shows a schematic view of a blade arrangement according to a first embodiment of the present disclosure.
Figure 3:
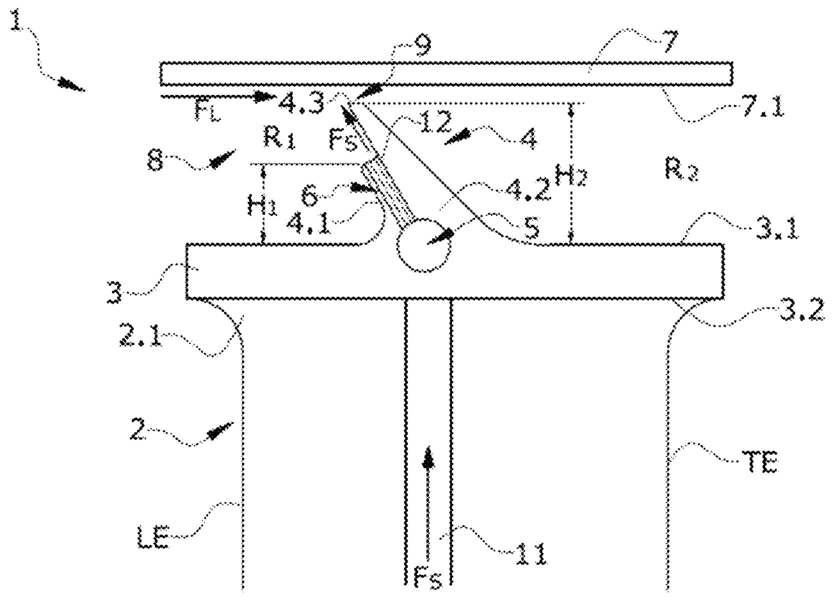
FIG. 3 This figure shows a schematic view of a blade arrangement according to a second embodiment of the present disclosure.
Figure 5:
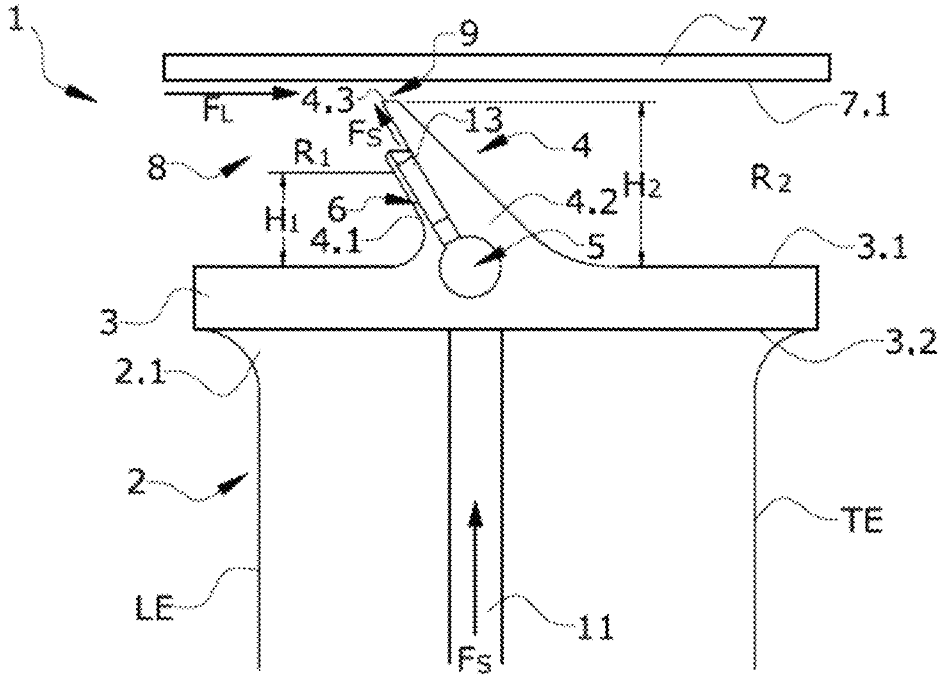
FIG. 5 This figure shows a schematic view of a blade arrangement according to a third embodiment of the present disclosure.

FIGS. 1, 3 and 5 show different embodiments of a structure arrangement (1) with a structure for a gas turbine engine, wherein this structure is specifically a blade.

The structure arrangement (1) shown in any of the embodiments of FIGS. 1, 3 and 5, is a blade arrangement that comprises a blade with a body (2) and a housing (7) that at least partially surrounds the blade. There is a clearance or a gap (8) between the blade and the housing (7) through which a leaking fluid ($F_L$) flows when the gas turbine engine is running.

The blade shown in these FIGS. 1, 3 and 5 comprises a body (2) that is extended from a root end (not shown) to a tip end (2.1) closer to the housing (7). The blade further comprises a leading edge (LE) faced to a higher pressure forward cavity and a trailing edge (TE) opposite to the leading edge (LE) and being faced to a lower pressure rear cavity. According to the blade arrangement (1), there is a leaking fluid ($F_L$) flowing from the higher pressure forward cavity towards the lower pressure rear cavity when the gas turbine engine is running.

At the tip end (2.1) of the body (2) of the blade there is a shroud (3) substantially curved (although this is not represented in the figures). The shroud (3) goes beyond the leading edge (LE) and the trailing edge (TE) respectively as it can be observed in any of FIGS. 1, 3 and 5.

Figure 2:
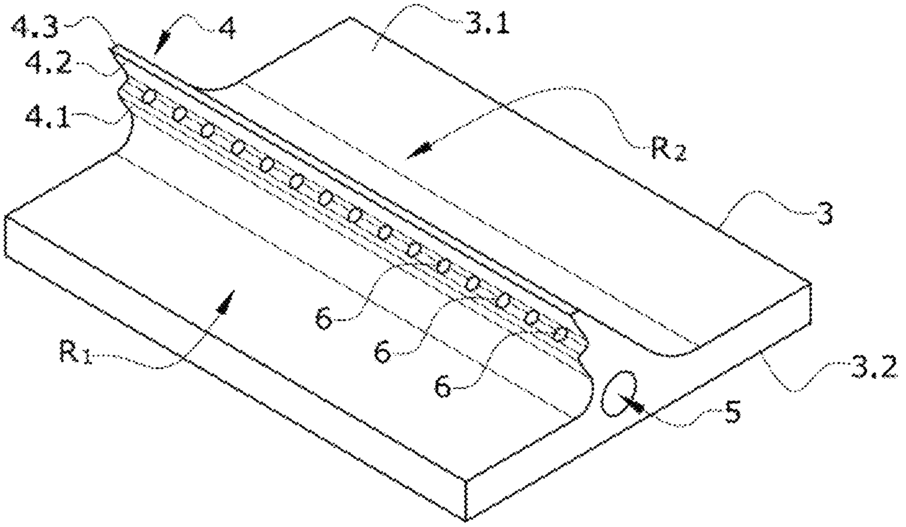
FIG. 2 This figure shows a schematic perspective view of a portion of the blade shown in FIG. 1.
Figure 4:
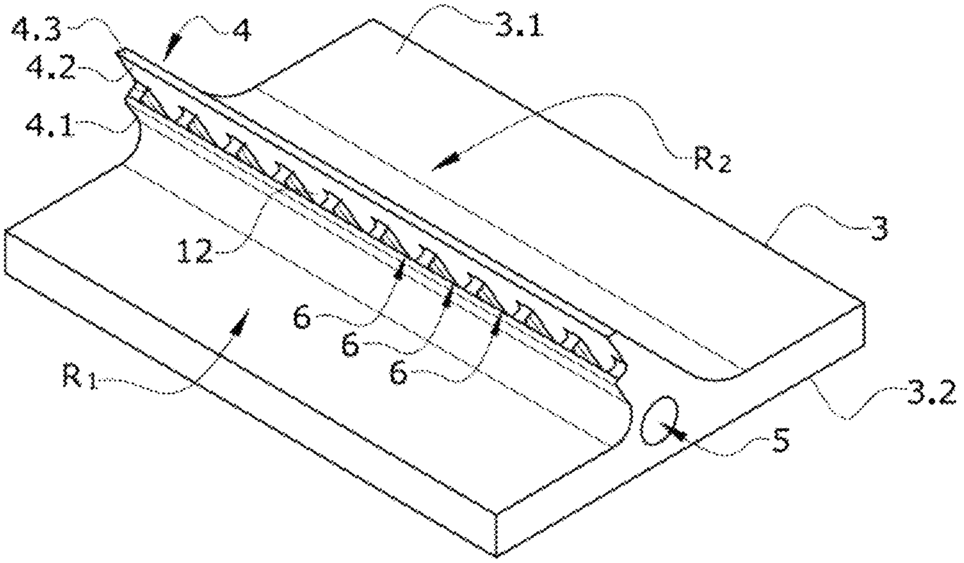
FIG. 4 This figure shows a schematic perspective view of a portion of the blade shown in FIG. 3.
Figure 6:
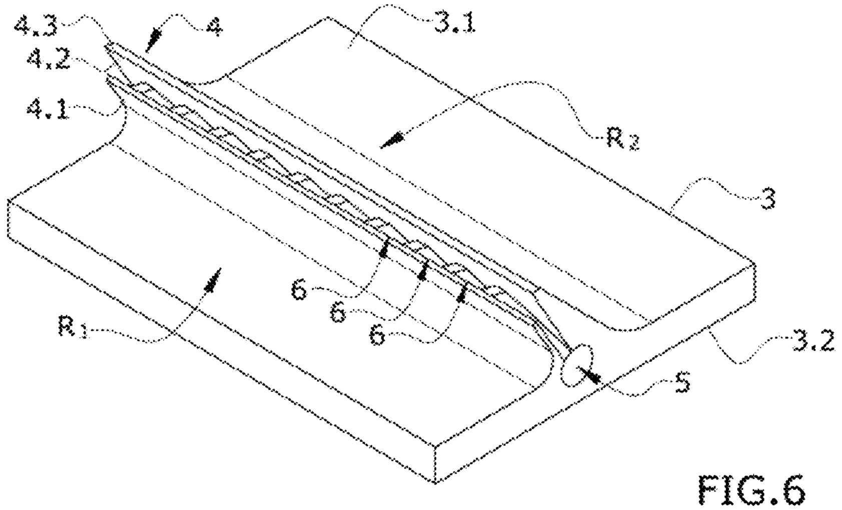
FIG. 6 This figure shows a schematic perspective view of a portion of the blade shown in FIG. 5.

FIGS. 2, 4 and 6 show in detail the shroud (3) according to the embodiments of FIGS. 1, 3 and 5, respectively. The shroud (3) comprises a cooling conduct (5) that extends across the shroud (3). In these embodiments, the cooling conduct (5) has a circumferential cross-section and is in fluid communication with a channel (11) arranged through a portion of the body (2) of the blade from the root end to the tip end (2.1). This channel (11) is adapted for channeling a sealing fluid ($F_S$) through the body (2) of the blade towards the cooling conduct (5) and then injected out of the shroud (3) to seal the gap (8) between the housing (7) and the blade.

In addition, the shroud (3) comprises a seal fin (4) protruding towards the gap (8) between the tip end (2.1) of the body (2) of the blade and the housing (7), as shown in FIGS. 1, 3 and 5. The shroud (3) further comprises a first shroud surface (3.1) faced towards the gap (8) and a second shroud surface (3.2), opposite to the first shroud surface (3.1), the second shroud surface (3.2) being faced towards the root end (not shown) of the body (2) of the blade.

The higher pressure forward cavity already mentioned above corresponds to a first region (R1) that is arranged between the seal fin (4) and a portion of the shroud (3) closer to the leading edge (LE). The lower pressure rear cavity corresponds to a second region (R2) arranged between the seal fin (4) and a portion of the shroud (3) closer to the trailing edge (TE). These regions (R1, R2) are opposite each other relative to the seal fin (4).

According to any of the embodiments shown in figures, the seal fin (4) comprises a fore wall (4.1) and an aft wall (4.2). The fore wall (4.1) comprises a first height ($H_1$) from the first shroud surface (3.1) towards the housing (7), and the aft wall (4.2) comprises a second height ($H_2$) also from the first shroud surface (3.1) towards the housing (7). In these embodiments, the first height ($H_1$) is lower than the second height ($H_2$) but greater than 0.

As it can be observed in FIGS. 1, 3 and 5, the seal fin (4) protrudes from the first shroud surface (3.1) and is at an incline towards the first region (R1). In an embodiment not shown, the seal fin (4) is not inclined towards the first region (R1).

Once the sealing fluid ($F_S$) achieves the cooling conduct (5), it is injected through the seal fin (4) into the higher pressure forward cavity, i.e., the first region R1. Specifically, the shroud (3) comprises a cooling passage (6) extending from the cooling conduct (5) through the seal fin (4) for communicating such cooling conduct (5) with the first region (R1). This cooling passage (6) is extended parallel to a fore surface of the aft wall (4.2) faced to the first region (R1) closest to the cooling passage (6). That is, the cooling passage (6) starts from the cooling conduct (5) and goes through the seal fin (4) between both the fore (4.1) and aft (4.2) walls, and finally continues along the rest of the fore surface of the aft wall (4.2). In this sense, the sealing fluid ($F_S$) that is injected from the cooling conduct (5), flows through the cooling passage (6), first flowing between the fore wall (4.1) and the aft wall (4.2) of the seal fin (4), and then continues flowing parallel to the fore surface of the aft wall (4.2) while some of the sealing fluid ($F_S$) begins to interact with a fluid within the first region (R1) losing some of its speed. The injection of the sealing fluid ($F_S$) through the cooling passage (6) into the first region (R1) decreases the amount of leaking fluid ($F_L$) from the first region (R1) to the second region (R2). By increasing the amount of sealing fluid ($F_S$), the leaking fluid ($F_L$) would continue to decrease to a point where the sealing fluid ($F_S$) is high enough to prevent the passage of leaking fluid ($F_L$) from the first region (R1) to the second region (R2). Thus, the gap (8) between the tip end (2.1) of the body (2) and the housing (7) is sealed.

As it can be observed in any of the figures, the cooling passage (6) is arranged according to a direction that forms an angle relative to a longitudinal direction of the cooling conduct (5) through the shroud (3). In an embodiment, this angle is lower than 90°.

FIGS. 1, 3 and 5 show the path that the sealing fluid ($F_S$) follows as well as the path of the leaking fluid ($F_L$).

FIGS. 1 and 2 show a first embodiment where the shroud (3) comprises a plurality of cooling passages (6) which are distributed along the shroud (3) and extend from the cooling conduct (5) through the seal fin (4). Specifically, this embodiment shows a row of holes as cooling passages (6) with a cylindrical configuration. As it can be observed in FIG. 2, each cooling passage (6) has a circumferential cross-section.

FIGS. 3 and 4 show a second embodiment where the shroud (3) comprises a plurality of cooling passages (6) which are distributed along the shroud (3) and extend from the cooling conduct (5) through the seal fin (4). Specifically, this embodiment shows a row of slots (12) as cooling passages (6) with a configuration of prism with a polygonal base as it can be observed in detail in FIG. 4. Specifically, in this embodiment the slots (12) or cooling passages (6) are inclined at an angle of 90° relative to the longitudinal axis passing through the cooling conduct (5).

FIGS. 5 and 6 show a third embodiment where the shroud (3) comprises a plurality of cooling passages (6) which are distributed along the shroud (3) and extend from the cooling conduct (5) through the seal fin (4). Specifically, this embodiment shows a row of slots (12) as cooling passages (6) wherein these slots (12) or cooling passages (6) are inclined at an angle other than 90° relative to the longitudinal axis passing through the cooling conduct (5).

According to FIGS. 1, 3 and 5, the housing (7) comprises an inner surface (7.1) adapted to be faced towards the gap (8) between the housing (7) and the tip end (2.1) of the blade (2). These figures further show a throat (9) between an end tip (4.3) of the seal fin (4), specifically located on the aft wall (4.2), and the housing (7). In an embodiment, there is a point when the gas turbine engine is running i.e. when the blade rotates due to the gas turbine engine running, that the end tip (4.3) of the seal fin (4) may rub against the inner surface (7.1) of the housing (7).

In another embodiment not shown in figures. The cooling passage (6) is a single continuous slot along the shroud (3).

In another embodiment not shown in figures, the seal fin (4) is provided without a fore wall (4.1).

In another embodiment not shown in figures, the structure is a disc or a bearing for a gas turbine engine.

What is claimed is:

1. A structure for a gas turbine engine, the structure comprising:

a body extending from a root end to a tip end;

a leading edge and a trailing edge, wherein the leading edge is adapted to be faced towards a leaking flow; and a shroud arranged at the tip end of the body and comprising at least one seal fin and a cooling conduct, the cooling conduct extending across the shroud, wherein:

between the seal fin and a portion of the shroud proximal to the leading edge there is a first region, and between the seal fin and a portion of the shroud proximal to the trailing edge there is a second region; the first region being adapted to be faced towards the leaking flow and the second region being opposite to the first region relative to the seal fin;

the seal fin comprises a fore wall and an aft wall, the fore wall comprising a first height $H_1$ and the aft wall comprising a second height $H_2$ different to the first height $H_1$, wherein $$0 \leq \frac{H_1}{H_2} < 1;$$

the shroud further comprises a cooling passage extending from the cooling conduct through the seal fin to communicate the cooling conduct with the first region; and the cooling passage extends parallel to a surface of the aft wall closest to the cooling passage, so that a sealing fluid injected from the cooling conduct flows through the cooling passage and parallel to said surface of the aft wall.

2. The structure according to claim 1, wherein the first height $H_1$ of the fore wall is 0.

3. The structure according to claim 1, wherein the first height $H_1$ of the fore wall is greater than 0 and lower than the second height $H_2$ of the aft wall.

4. The structure according to claim 1, wherein the seal fin is inclined towards the leading edge relative to the shroud.

5. The structure according to claim 1, wherein the cooling passage is a prism with a polygonal base.

6. The structure according to claim 1, wherein the cooling passage comprises a cylindrical configuration.

7. The structure according to claim 1, wherein the cooling passage is inclined at an angle 90° relative to a longitudinal axis passing through the cooling conduct.

8. The structure according to claim 1, wherein the cooling passage is inclined at an angle different from 90° relative to a longitudinal axis passing through the cooling conduct.

9. The structure according to claim 1, wherein the shroud comprises a plurality of cooling passages distributed along the shroud and extended from the cooling conduct through the seal fin.

10. The structure according to claim 1, wherein the cooling passage is a single continuous slot along the shroud.

11. The structure according to claim 1, wherein the structure is a blade.

12. A structure arrangement for a gas turbine engine, the structure arrangement comprising:

the structure according to claim 1;

a housing at least partially surrounding the structure; and a gap extended between the tip end of the body of the structure and the housing, wherein the seal fin of the structure protrudes from the shroud through the gap leaving a throat between an end tip of the seal fin and the housing.

13. A gas turbine engine comprising the structure arrangement according to claim 12.

* * * * *